(12) United States Patent
Chapman

(10) Patent No.: US 7,102,107 B1
(45) Date of Patent: Sep. 5, 2006

(54) METHOD, APPARATUS AND SYSTEM FOR PREDICTING COOKING COMPLETION TIME OF FOOD

(75) Inventor: Peter A. Chapman, Avon By The Sea, NJ (US)

(73) Assignee: Maverick Industries, Inc., Edison, NJ (US)

( * ) Notice: Subject to any disclaimer, the term of this patent is extended or adjusted under 35 U.S.C. 154(b) by 0 days.

(21) Appl. No.: 10/922,462

(22) Filed: Aug. 20, 2004

(51) Int. Cl.
H05B 1/02 (2006.01)

(52) U.S. Cl. .............. 219/494; 219/710; 219/712; 219/492; 219/497; 99/325

(58) Field of Classification Search .......... 219/492, 219/494, 497, 499, 501, 505, 412–414, 483–486, 219/710–713; 307/117; 374/170, 185, 208, 374/120; 99/325
See application file for complete search history.

(56) References Cited

U.S. PATENT DOCUMENTS

| 5,102,674 A | * | 4/1992 | Lehman | 426/233 |
| 5,352,866 A | * | 10/1994 | Cartwright et al. | 219/497 |
| 6,083,543 A | * | 7/2000 | Kim et al. | 426/231 |
| 6,146,015 A | | 11/2000 | Weiss | |
| 6,293,188 B1 | | 9/2001 | Gabriel | |
| 6,539,842 B1 | | 4/2003 | Chapman et al. | |
| 6,568,848 B1 | * | 5/2003 | Chapman et al. | 374/155 |
| 6,712,505 B1 | | 3/2004 | Chapman et al. | |
| 6,811,308 B1 | | 11/2004 | Chapman et al. | |

FOREIGN PATENT DOCUMENTS

JP 403017425 A * 1/1991

* cited by examiner

*Primary Examiner*—Mark Paschall
(74) *Attorney, Agent, or Firm*—Lerner, David, Littenberg, Krumholz & Mentlik, LLP

(57) ABSTRACT

Method, apparatus and systems for predicting the cooking time of an item food includes predicting the cooking time based on the rate of change of the internal temperature of the food item. The apparatus includes a processor that implements the calculations and the system may include the apparatus along with a temperature sensor.

39 Claims, 4 Drawing Sheets

METHOD, APPARATUS AND SYSTEM FOR PREDICTING COOKING COMPLETION TIME OF FOOD

FIELD OF THE INVENTION

The present invention relates to systems, apparatus and methods for cooking foods and, in particular, to systems, apparatus and methods that are used in predicting the time that an item of food will attain a desired cooking temperature.

BACKGROUND OF THE INVENTION

The ability to multi-task or do many things at the same time is required in many human endeavors. Food preparation is one such example. With the preparation of a meal, multi-tasking often involves cooking various foods that make up a main course such as meat, vegetables and rice, and also preparing a salad, beverage and dessert during approximately the same time period. Timing all of this preparation is often difficult. For professional cooks, multi-tasking in meal preparation is often more important and difficult as many meals have to be prepared at the same time. For regular and professional cooks, the need to manage the various tasks associated with preparing a meal is also further complicated because the cooking completion time of food is often not accurately known.

In this regard, although many recipes provide an approximate time when a given food will be ready or cooked, these times can often be inaccurate. For example, with meat, the suggested cooking time typically depends on the size of the meat and the temperature of the cooking surface or oven. If the cut of meat or temperature of the oven vary from the average or expected, the suggested cooking time will not be accurate. Thus, the suggested cooking time may need to be adjusted based on experience and by past problems when the food is either undercooked or overcooked. Given variations in cooking time, the cook is typically required to attend to the food being cooked by constantly monitoring its state of readiness. For example, the cook usually monitors the cooking state by the use of a meat thermometer which requires that the cooking process be interrupted and monitored or by inserting a knife or fork into the meat or by noting whether the color of the meat is desirable. Alternatively, the cook may set a timer depending on the suggested cooking time. In either case, the cook's time is used inefficiently as the suggested cooking time is often inaccurate.

Therefore, in view of the above problems with cooking time, there is a need for new methods, apparatus and systems that allow a person cooking food to know with an improved level of accuracy the cooking completion time of food that is being cooked.

SUMMARY OF THE INVENTION

One aspect of the present invention provides an apparatus for determining food cooking completion time. The apparatus preferably comprises a housing including a processor, a user input interface, and a display for providing information about the food being cooked to a user. The apparatus further preferably includes a receptacle for receiving internal temperature readings of the food being cooked. Most preferably, the processor is operable to acquire the received internal temperature readings, calculate a difference between at least two of the acquired temperature readings to produce a calculated difference and determine the food cooking completion time based on the calculated difference and a user inputted desired temperature.

In accordance with this aspect of the present invention, the user input interface desirably comprises a dial or button capable of allowing a user to input the desired temperature.

In accordance with the apparatus, it is also desirable that the display comprises an LCD operable to show the food cooking completion time. Most preferably, the display is further operable to show the user inputted desired temperature, a type of food being cooked and an actual cooking temperature.

Further in accordance with this aspect of the present invention, the receptacle preferably comprises an input jack capable of accepting a temperature sensor. It may also prove desirable to have an antenna that is capable of accepting a wireless transmission from a temperature sensor.

Further in accordance with this aspect of the present invention, the processor desirably calculates the difference by computing a difference between the currently acquired internal temperature reading and the previously acquired internal temperature reading to produce the calculated difference. Further still, the processor may desirably compute a rate of change by dividing the calculated difference by the time interval over which the calculated time difference occurred. In addition, the processor may desirably determine the food cooking completion time by dividing the difference between the user inputted desired temperature and the current internal temperature by the computed rate of change.

A further aspect of the present invention is a food thermometer system. The system preferably comprises a temperature probe insertable into food being cooked to sense the internal temperature of the food being cooked and a transmitter to acquire temperature readings from the probe and transmit the acquired temperature readings. The system further desirably includes a receiver in communication with the transmitter for receiving the transmitted temperature readings and predicting a cooking completion time of the food being cooked based on the rate of change in the temperature readings.

In accordance with this aspect of the present invention, the system preferably includes a processor that is programmed to predict the cooking completion time. Most preferably, the processor stores the acquired temperature readings, computes the differences between at least two of the stored temperature readings and calculates the cooking completion time based on said computed difference and a predetermined temperature. It is further desirable that the difference be computed by determining the difference between the last stored temperature reading and the current temperature reading.

Further in accordance with this aspect of the present invention, the processor further desirably compares the computed difference with a cumulative difference of the stored temperature readings to produce a rate of change of temperature and computes the cooking completion time based on the rate of change temperature, the time interval over which the rate of change of temperature occurred and the predetermined temperature.

Further still in accordance with this aspect of the present invention, the receiver preferably includes a display area that is operable to display at least the predicted cooking completion time. It may also prove desirable to display a graph that indicates to a user the predicted cooking completion time.

In accordance with this aspect of the present invention, the transmitter may be coupled to the temperature probe by a substantially flexible communication line which preferably allows the temperature probe to be oriented in a plurality of positions relative to said transmitter. In addition, it may prove desirable to have the receiver include a speaker for providing an audible indication of the predicted cooking completion time.

Further still, it may prove desirable if receiver is operable to select a type of food being cooked. In addition, the selection of the type of food being cooked preferably includes a meat selected from the group consisting of beef, pork, fish and poultry.

Further still in accordance with this aspect of the present invention, the transmitter may be operable to select a type of food being cooked. The selection of the type of food being cooked may preferable include a meat selected from the group consisting of beef, pork, fish and poultry.

In accordance with another aspect of the present invention, a food thermometer system is provided. The system comprises a temperature sensor that is insertable in food being cooked, the sensor being operable to detect the internal temperature of the food being cooked and a first unit connected to the temperature sensor, the first unit being operable to acquire temperature readings detected by the temperature sensor and predict a time remaining for the food being cooked to reach a select temperature based on the detected temperature readings.

Further in accordance with this aspect of the present invention, the first unit preferably includes a processor programmed to predict the time remaining for the food being cooked to reach a select temperature by performing a method. The method preferably comprises storing the temperature readings, computing the differences between at least two of the stored temperature readings and predicting the time remaining for the food being cooked based on the computed difference and the select temperature.

Most preferably, the difference is computed by determining the difference between the last stored temperature reading and the current temperature reading.

Further still, predicting as performed by the processor most preferably comprises comparing the computed difference with the cumulated difference of the stored temperature readings to produce a rate of change of temperature and computing the remaining cooking time for the food being cooked based on the rate of change of temperature, the time interval over which the rate of change of temperature occurred and the select temperature.

Further in accordance with this aspect of the present invention, the first unit is preferably operable to transmit the time remaining for the food being cooked to reach a select temperature. Further still, the system preferably comprises a second unit operable to receive the time remaining for the food being cooked to reach a select temperature transmitted by the first unit. In addition, the second unit most preferably includes a display section operable to display the time remaining for the food being cooked to reach a select temperature. In addition, the first unit may also be operable to select a type of food being cooked, as well as being operable to select a taste of the food being include.

In yet another aspect, the present invention is a method for predicting the cooking time of food being cooked. The method preferably includes acquiring the internal temperature of the food being cooked; storing the acquired internal temperature readings in a memory; computing the difference between the current temperature reading and the previous temperature reading; and predicting the cooking time of the food being cooked based on the determined difference and a predetermined internal cooking temperature.

Further, in accordance with the method, the internal temperature readings are preferably acquired at 30-second intervals. In addition, the method may further desirably comprise storing each of the computed differences.

Further still in accordance with the method, the step of predicting most desirably comprises comparing the difference between the current temperature and the previous temperature reading with each of the computed differences and calculating the time remaining until the pre-determined internal cooking temperature is reached.

DETAILED DESCRIPTION

Figure 1:
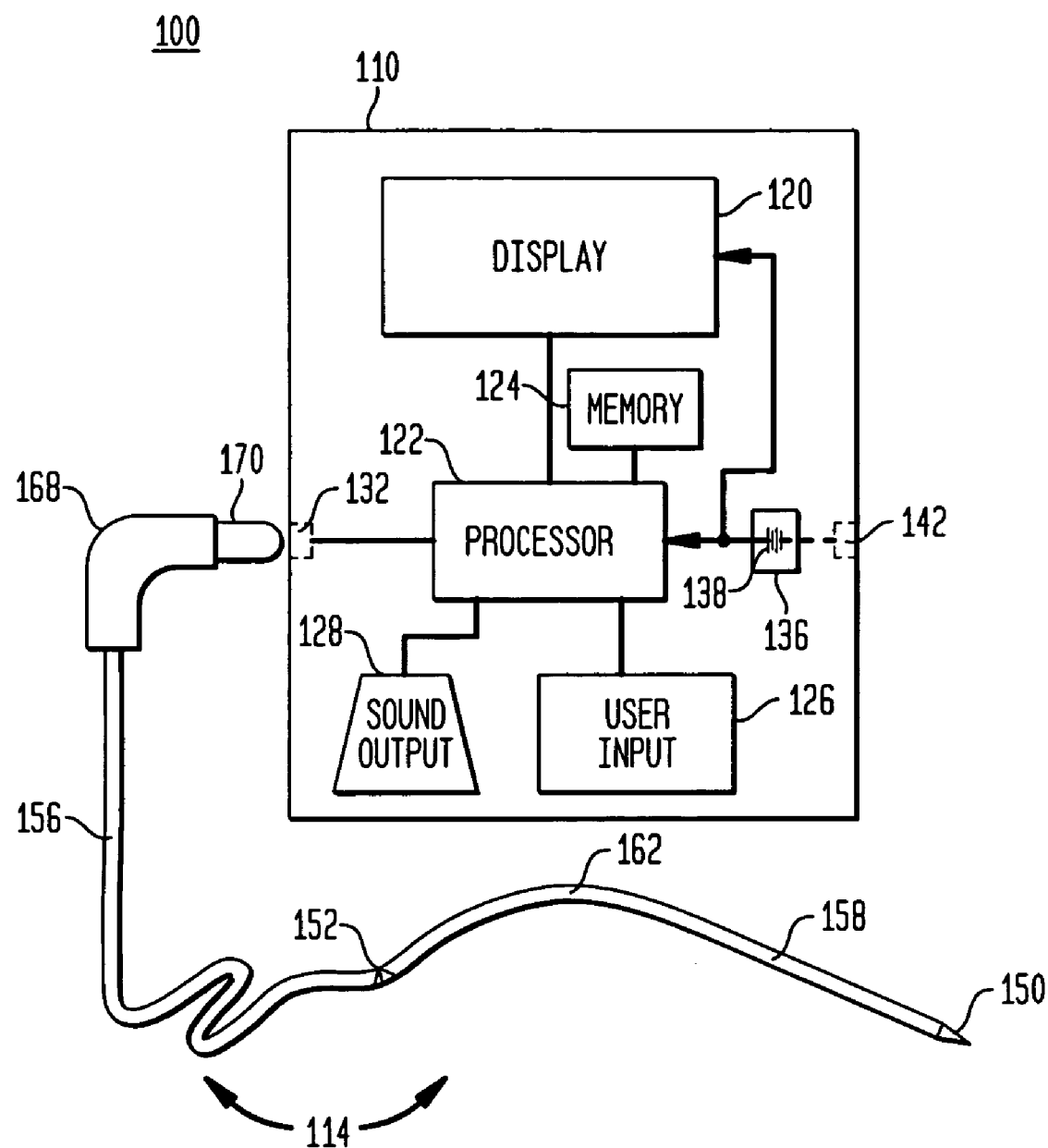
FIG. 1 is a schematic block diagram depicting a cooking time prediction system in accordance with an aspect of the present invention.

FIG. 1 is a schematic block diagram of apparatus 100 for predicting the cooking time of food being cooked in accordance with an aspect of the present invention. The apparatus includes a main unit 110 and a temperature probe 114. Main unit 110 includes a display area 120, a processor 122, a user input area 126 and a sound output block 128. Main unit 110 further preferably includes a receptacle or input port 132 for receiving the temperature probe 114. The apparatus is powered via a voltage supply 136, which may comprise a rechargeable or disposable battery 138 or an AC or DC connection via receptacle 142.

Functionally, the apparatus receives temperature readings that are detected by the temperature probe 114. The temperature readings are acquired by processor 122, which is preferably a microprocessor or microcomputer capable of performing or executing instructions storable as software or firmware in a memory, such as memory 124, which can comprise a RAM, ROM, memory card or any other type of storage device for storing the instruction. Memory 124 and processor 122 may be separately provided or integrated as one unit. The processor 122 computes the cooking time remaining based on the temperature readings and a predetermined or desired cooking temperature that is preferably provided by a user via user input block 126. The processor then informs the user of the remaining cooking time via the display 120 or sound output 128. Processor 122 may also provide a graph indicating the increase in temperature as a function of time. Such a graph may also display a desired temperature superimposed on the same display with the graph.

The display 120 is preferably a liquid crystal display (LCD), but may be any other type of display that is capable of displaying text or image data information to a user. Accordingly, the display 120 may also include a plasma screen, LEDs or the like. In addition to displaying the remaining cooking time, the display 120 may also display other information such as user settable information including the desired cooking temperature, as well as other information including the length of time that food has been cooking, the current temperature reading of the food being cooked, a taste setting and the type of food being cooked.

The user input block 126 provides an interface for the user to input data into the main unit 110 and may include any number of inputs, such as dials, buttons or keys that allows a user to input a pre-determined or desired cooking temperature and perform other functions necessary for operation of the device. The user input block 126 may also include an on-off power switch that turns the apparatus on or off. Alternatively, an on-off power switch may be provided separate from the user input block 126.

Furthermore, although the user input 126 is shown separate from the display 120, it is also possible to provide a display 120 that includes the user input function. For example, the display may be touch sensitive and responsive to a user's touch or a stylus and allow for the selection of various operational functions on the display itself.

Sound output 128 preferably comprises a speaker that provides sound to announce the time remaining for the food being cooked to reach the desired temperature. Possible announcements run the gamut and may include, for example, spoken announcements such as "YOUR MEAL WILL BE READY IN TEN MINUTES." The apparatus may also announce other information relevant to the food being cooked, including the internal temperature of food, etc. Processor 122 preferably has the ability to generate the spoken announcements by including, for example, data-to-voice signal processing capability.

As previously discussed, the temperature probe 114 is preferably detachable and insertable into the apparatus 110 via receptacle 132. Receptacle 132 may alternatively comprise a communication jack or a wireless port for wireless receipt of temperature data from a wireless temperature probe. Alternatively, the temperature probe 114 may be affixed to the main unit 110.

The temperature probe 114 is preferably made of a substantially rigid material such as stainless steel. The temperature probe 114 includes a distal end having a pointed end 150 to facilitate piercing of the food and a proximal end 152 connected to a communication line 156. Communication line 156 is preferably substantially flexible so that temperature probe 114 may be positioned at various orientations relative to the main unit 110. The temperature probe 114 includes a substantially straight section 158 to provide rigidity for food insertion extending from the distal end and a curved section 162 extending between the straight section 158 and proximal end 152. Flexible communication line 156 includes a first end attached to the proximal end 152 of temperature probe 114. Communication line 156 also includes a plug 168 having a male end 170 that is insertable into the receptacle 132, which is preferably accessible on the exterior of main unit 110. In operation, plug 168 is inserted into receptacle 132 of the main unit 110 so that temperature readings may be transmitted between the probe 114 and the main unit 110. Preferably, the pointed end 150 is inserted into a food item, such as beef or poultry, and monitors the internal temperature of the food item.

Figure 2:
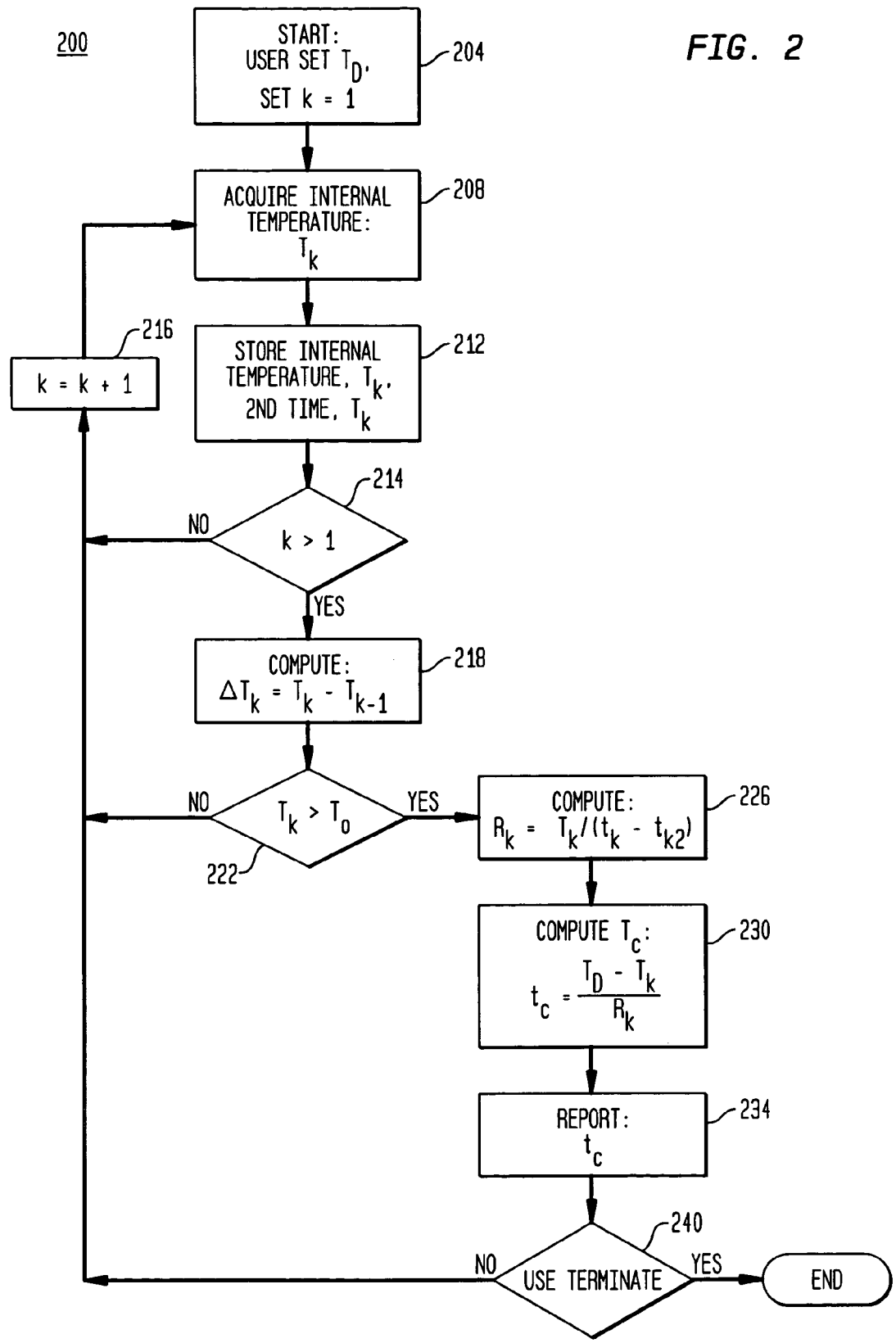
FIG. 2 is a flow diagram that depicts a cooking time prediction method in accordance with an aspect of the present invention.

FIG. 2 depicts a method or process 200 for determining the time remaining for a food item to reach a desired temperature in accordance with a preferred aspect of the present invention.

As shown in FIG. 2, the process starts at block 204, which requires a user to set a desired temperature $T_D$. The desired temperature $T_D$ is the temperature at which the food item would be cooked to a user's satisfaction. As previously discussed, the user can set $T_D$ via user input block 126. In addition to setting the desired temperature, the user could also insert the temperature probe 114 into the food item so that internal temperature readings of the food item may be acquired and used at the desired temperature. At block 204, the processor 122 would also desirably have a memory available, such as memory 124, in which to record the set or acquired temperature readings.

The process 200 continues at block 208 with the acquisition of the internal temperature of the food item being cooked. Preferably, the internal temperature is acquired by the processor 122 from the temperature probe 114 which is inserted into the food item. Illustratively, the temperature readings are depicted as $T_k$, where k indicates the number of readings taken during the process. Initially, k is set to 1. Therefore, the first reading would be denoted as $T_1$ and the ith reading would be denoted as $T_i$. At block 212, the temperature reading $T_k$ is stored. In addition to $T_k$, at block 212 the time tk at which the reading $T_k$ was taken or stored may also be recorded. As such, the temperature reading, as well the time the temperature reading was taken, is stored.

At decision diamond 214, a determination is made of whether the temperature reading, $T_k$, was the first temperature reading. If $T_k$ is the first temperature reading, then the value of k is incremented by 1 at block 216 and the process returns to block 208 and continues on to blocks 212 and 214. If $T_k$ is not the first temperature reading, then the process continues block 218 where the difference between the current temperature reading, $T_k$, and the previous temperature reading $T_{k-1}$ are calculated. The difference is denoted as $\Delta T_k$.

Next, a check is made at diamond 222 to determine whether $\Delta T_k$ is greater than a predetermined threshold temperature $T_0$. The threshold temperature $T_0$ represents a temperature value that the difference $\Delta T_k$, which represents the change in temperature of the food being cooked, must exceed in order for the process to reliably predict the remaining cooking time. For example, if the item of food being cooked is meat that was frozen, the internal temperature of the meat will remain fixed for some period of time before it starts to increase. As such, the value of $T_0$ may be set to any value greater than 0. Preferably, the value of $T_0$ may be set to some percentage, preferably less than 10%, of $T_D$. Thus, for example, if $T_d$ is set to 140° F., then $T_0$ may be set to 1% of $T_d$ so that the process updates the cooking time remaining only if the change in temperature increases by more than the threshold value of 1.4° F. Alternatively, the process may operate such that once the temperature readings start increasing, then the cooking time remaining is updated with each newly acquired temperature reading.

If $\Delta T_k$ is less than $T_0$, then the process returns to block 216 where k is incremented by 1. The process then returns to block 208 and then ultimately returns to diamond 222.

If $\Delta T_k$ is determined to be greater than $T_0$ at diamond 222, processing continues to block 226 where the rate of change of temperature over a unit of time, e.g., $R_k$, is computed. As shown, $R_k$ is determined using the following formula:

$$R_k = \Delta T_k/(t_k - t_{k-1})$$

As the formula indicates, the rate of change of temperature is equal to the change in temperature, $\Delta T_k = T_k - T_{k-1}$ divided by the time interval over which the change in temperature for two consecutive readings was recorded. In accordance with an aspect of the present invention, the time interval between two consecutive readings may be set to constant, e.g., 30 seconds, by acquiring each temperature reading at a regular interval. In this way, the process may be simplified.

At block 230, the remaining cooking time, $t_c$, may then be calculated based on the difference in temperature between the desired temperature, $T_d$, the current temperature reading, $T_k$, and the rate of temperature change, $R_k$. In an aspect of the present invention, the steps of blocks 226 and 230 may be done as one computation. Once the remaining cooking time is calculated, it may then be reported to the user as is indicated at block 234. That report may comprise an audible announcement or updating of the time remaining on a visual display.

From block 234, the process continues to diamond 240. If at diamond 240 a user decides to terminate the program either by, for example, powering down the device or interrupting the process (e.g., removing the temperature probe), then the process ends at block 244. Otherwise, the process returns to block 208 via block 216 and repeats.

Figure 3:
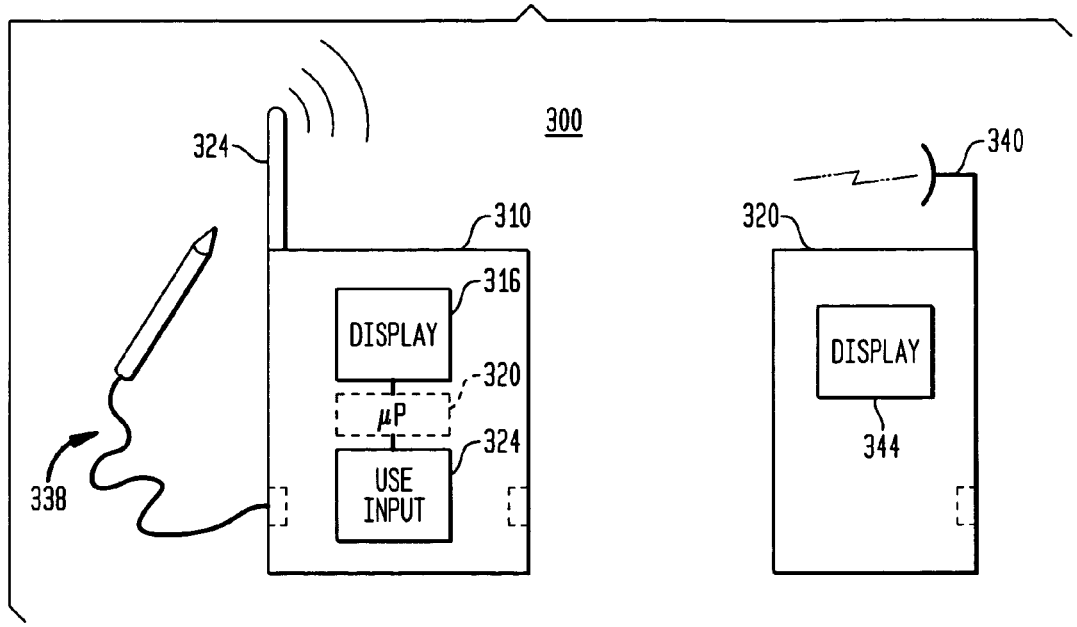
FIG. 3 depicts a cooking time prediction system in accordance with another aspect of the present invention.

Turning now to FIG. 3, there is shown a system 300 in accordance with another aspect of the present invention. In accordance with FIG. 3, the system includes a first unit 310, which includes a display 316, a processor 320, a memory 322 and a user input panel 324. The first unit also includes a transmitter, which is depicted via antenna 324, for transmitting the remaining cooking time to a second unit 330, which also forms a part of the system 300. The system also includes a temperature probe or sensor 338, which is shown as being coupled to the first unit 310. The second unit 330 includes a receiving antenna 340 and a display 344. In accordance with this aspect of the present invention, the first unit 310 acquires the internal temperature readings of an item of food being cooked via measurements made by the temperature sensor 338 as previously described. The processor 320 then calculates the time remaining to be cooked based on the temperature readings and transmits the time remaining to the second unit 330, where such time is reported to a user on display 344. Alternatively, the time may be reported in an audible fashion via a speaker (not shown) on the second unit 330. In accordance with this aspect of the present invention, the processing necessary to compute the cooking completion time (remaining cooking time) is calculated by the first unit 310, which is located by the food being cooked. The second unit 330 is then located by the user and as long the receiving antenna 340 is within the range of the transmitting antenna 324, then a user may perform other activities unrelated to cooking the meal and yet still feel confident the item of food will be cooked as desired or cooked to the desired temperature. For example, the first unit 310 can be located on a barbeque grill that is coking a steak outside while the cook and second unit 330 are inside working on preparation of a salad.

Figure 4:
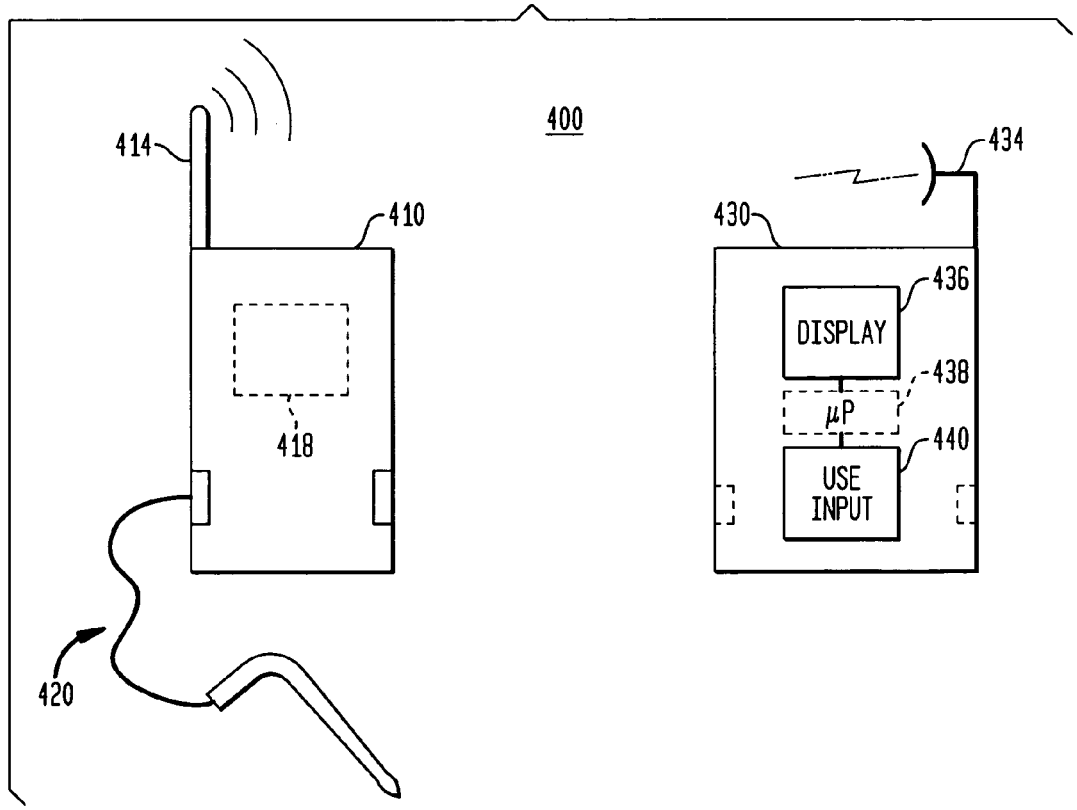
FIG. 4 depicts a cooking time prediction system in accordance with another aspect of the present invention.

FIG. 4 depicts another aspect of the present invention in which a system 400 comprises a first unit 410, which includes a transmitter (illustrated via antenna 414) and an optional display 418. The first unit is coupled to temperature sensor 420, as previously described, which is preferably adapted to measure the internal temperature of an item of food being cooked. The system 400 also includes a second unit 430 that includes a receiver (depicted via antenna 434), a display 436, a processor 438, a memory 439 and a user input block 440. In accordance with this aspect of the present invention, the first unit 410 acquires the internal temperature readings of the item of food being cooked via the sensor 420. The internal temperature readings are then transmitted to the second unit 430 where the processor 438 performs the calculations necessary to determine the remaining cooking time as previously described. The remaining cooking time is then reported to the user via display 436 or may be reported using a speaker as discussed above.

Figure 5:
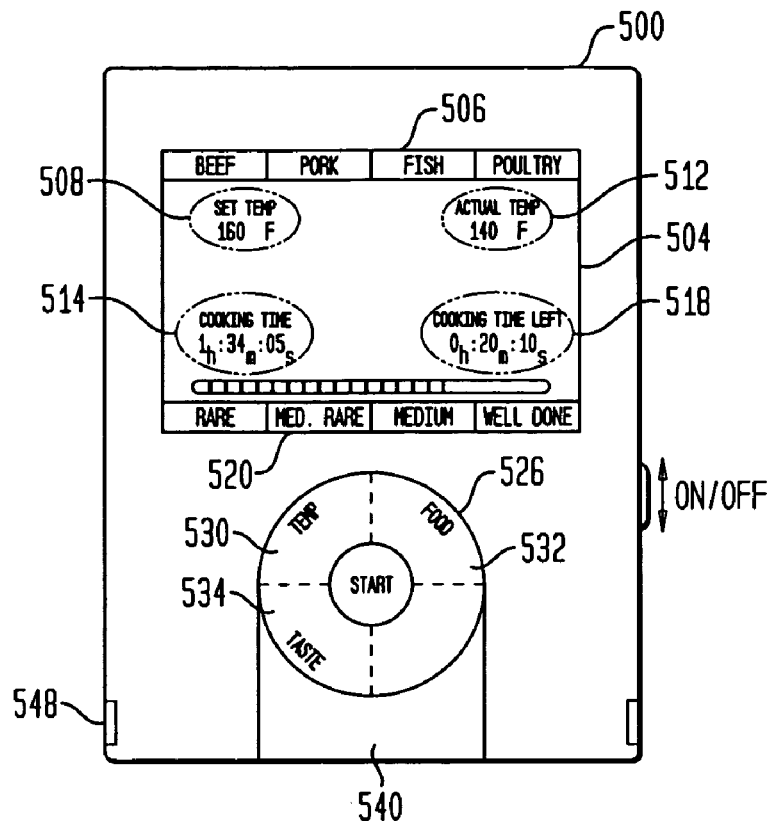
FIG. 5 depicts a cooking time prediction apparatus in accordance with a preferred aspect of the present invention.

Turning now to FIG. 5, there is shown an apparatus 500 in accordance with another aspect of the present invention, which can be used as unit 110, 310 or 410. The apparatus 500 includes a display area 504, which displays various information relating to an item of food, preferably meat, that is being cooked. That information includes the type of meat being cooked displayed in block 506, the set or desired temperature 508, the actual or current temperature 512, the elapsed cooking time 514, the remaining cooking time 518 and the taste preference (e.g., rare, medium rare, medium, well done) of the user 520. The apparatus 500 also includes a user select dial 526, which can be used to set one or more of the parameters shown in display area 504. As illustrated, the user select dial 526 can be used to set the temperature 530, the type of food 532 and the user's taste preference 534 as described below. The settings 530, 532 and 534 correspond to sub-areas 508, 506 and 520, respectively, in the display area 504. The device further includes a sound output area 540 through which a speaker provides an audible output. More particularly, the apparatus 500 forms a housing into which a speaker is mounted as well as a processor (e.g., a circuit board with microprocessor and memory) that controls the display area 504 and sound output, accepts input from the dial 526 and processes temperature readings acquired from a temperature probe that is insertable into jack 548.

In operation, the user may input a desired temperature by pressing the pressure sensitive portion 530 of the dial 526 and then turning the dial clockwise or counterclockwise to increase or decrease the displayed value. The desired temperature is then displayed in sub-area 508. Alternatively, the user may also select the type of food being cooked and the user's taste preference using pressure sensitive portions 532 and 534, respectively, of dial 526 and the device can automatically set the temperature, which is then display in sub-area 508. Once the desired temperature is set, the apparatus then acquires reading via jack 548 and calculates the cooking time remaining, which is displayed in sub-area 518. The device may also track and display the amount of time since cooking has begun and display that time in sub-area 514. The device may also display the current temperature reading at sub-area 512. Once the cooking time left 518 falls below a given time threshold, e.g., five minutes, the apparatus may then periodically provide an audible alert to the user indicating the amount of time remaining.

The apparatus of FIG. 5 may comprise either the first unit of FIG. 3 or the second unit of FIG. 4. In the case of FIG. 3, the first unit would need to be augmented to include a radio frequency transmitter to communicate with the second unit. In the case of the FIG. 4, the second unit would need to be equipped with a receiver to communicate with the first unit.

Figure 6:
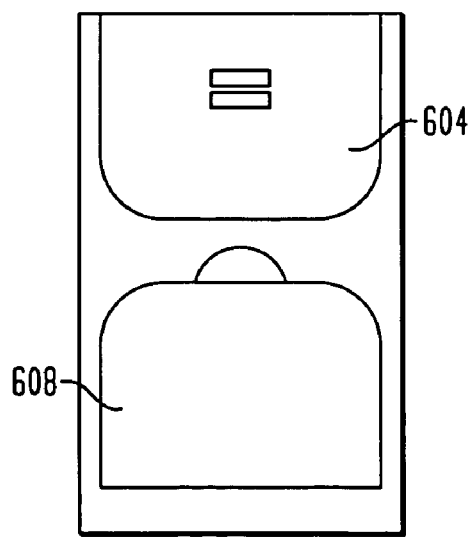
FIG. 6 depicts a rearward view of a cooking time prediction apparatus in accordance with an aspect of the present invention.

FIG. 6 depicts a rear view of the apparatus of FIG. 5 in accordance with a preferred aspect of the present invention. As FIG. 5, the apparatus may include a battery compartment 604 and foldable stand 608, which when folded down provides a support arm for the apparatus. Alternatively, the apparatus may be equipped with a belt clip (not shown) that allows a user to clip the apparatus to his/her belt or otherwise wear the apparatus.

Although the invention herein has been described with reference to particular embodiments, it is to be understood that these embodiments are merely illustrative of the principles and applications of the present invention. It is therefore to be understood that numerous modifications may be made to the illustrative embodiments and that other arrange-

The invention claimed is:

1. An apparatus for determining a food cooking completion time, comprising:
a housing including a processor, a user input interface, a display providing information about the food being cooked to a user and a receptacle for receiving internal temperature readings of the food being cooked,
said processor being programmed to:
acquire the received internal food temperature readings;
calculate a difference between at least two of the acquired internal food temperature readings to produce a calculated difference, compute a rate of change of the internal food temperature based on the calculated difference; and
determine the food cooking completion time based on the rate of the change and a user inputted desired internal food temperature.

2. The apparatus of claim 1, wherein said user input interface comprises a dial capable of allowing a user to input the desired temperature.

3. The apparatus of claim 1, wherein said display comprises an LCD operable to show the food cooking completion time.

4. The apparatus of claim 3, wherein said display is further operable to show the user inputted desired temperature, a type of food being cooked and an actual cooking temperature.

5. The apparatus of claim 1, wherein said receptacle comprises an input jack capable of accepting a temperature sensor.

6. The apparatus of claim 1, wherein said processor calculates the difference by computing a difference between the currently acquired internal food temperature reading and the previously acquired internal food temperature reading to produce the calculated difference.

7. The apparatus of claim 6, wherein said processor further computes the rate of change of the internal food temperature by dividing the calculated difference by the time interval over which the calculated time difference occurred.

8. The apparatus of claim 7, wherein said processor determines the food cooking completion time by dividing the difference between the user inputted desired internal food temperature by the computed rate of change of the internal food temperature.

9. A food thermometer system, comprising:
a temperature probe insertable into food being cooked to sense the internal temperature of the food being cooked;
a transmitter, coupled to said temperature probe, to acquire internal food temperature readings from said probe and transmit the acquired temperature readings; and
a receiver in communication with said transmitter for receiving the transmitted internal food temperature readings and predicting a cooking completion time of the food being cooked based on a rate of change of the internal food temperature readings.

10. The food thermometer system of claim 9, wherein said receiver includes a processor that is operable to predict the cooking completion time, said processor programmed to:
store the acquired internal food temperature readings;
compute a difference between at least two of said stored internal food temperature readings; and
calculate the cooking completion time based on said computed difference and a predetermined internal food temperature, the computed difference indicating a rate of change of the internal food temperature.

11. The food thermometer system of claim 10, wherein the difference is computed by determining the difference between the last stored temperature reading and the current temperature reading.

12. The food thermometer system of claim 10, wherein said processor further compares the computed difference of internal food temperature with a cumulative difference of the stored internal food temperature readings to produce a rate of change of temperature and computes the cooking completion time based on the rate of change internal food temperature, the time interval over which the rate of change of internal food temperature occurred and the predetermined internal food temperature.

13. The food thermometer system of claim 9, further comprising a display disposed on said receiver to display at least the predicted cooking completion time.

14. The food thermometer system of claim 9, further comprising a display disposed on said receiver, display at least a graph that indicates to a user the predicted cooking completion time.

15. The food thermometer system of claim 9, wherein said transmitter is coupled to said temperature probe by a substantially flexible communication line which allows said temperature probe to be oriented in a plurality of positions relative to said transmitter.

16. The food thermometer system of claim 9, wherein said receiver includes a speaker for providing an audible indication of the predicted cooking completion time.

17. The food thermometer system of claim 9, wherein said receiver is operable to select a type of food being cooked.

18. The food thermometer system of claim 17, wherein the selection of the type of food being cooked includes a meat selected from the group consisting of beef, pork, fish and poultry.

19. The food thermometer system of claim 9, wherein said transmitter is operable to select a type of food being cooked.

20. The food thermometer system of claim 19, wherein the selection of the type of food being cooked includes a meat selected from the group consisting of beef, pork, fish and poultry.

21. The food thermometer system of claim 9, wherein said transmitter is operable to select a taste of the food being cooked.

22. The food thermometer system of claim 21, wherein the selection of the taste includes a cooking taste selected from the group consisting of rare, medium rare, medium and well done.

23. The food thermometer system of claim 9, wherein said receiver is operable to select a taste of the food being cooked.

24. The food thermometer system of claim 23, wherein the selection of the taste includes a cooking taste selected from the group consisting of rare, medium rare, medium and well done.

25. A food thermometer system, comprising:
a temperature sensor insertable in food being cooked to detect the internal temperature of the food;
a first unit connected to said temperature sensor to acquire internal food temperature readings detected by said temperature sensor and predict a time remaining for the food being cooked to reach a select temperature based on the detected internal temperature readings; and a processor programmed to predict the time remaining for the food being cooked to reach the select temperature by:

storing the internal food temperature readings;

computing the differences between at least two of the stored internal food temperature readings, the calculated difference indicating a rate of change of the internal food temperature; and predicting the time remaining for the food being cooked based on the rate of change of the internal food temperature and the selected internal food temperature.

26. The food thermometer system of claim 25, wherein the difference is computed by determining the difference between the last stored temperature reading and the current temperature reading.

27. The food thermometer system of claim 25, wherein predicting further comprises comparing the computed difference with a cumulative difference of the stored internal food temperature readings to produce a rate of change of internal food temperature and computing the remaining cooking time for the food being cooked based on the rate of change of internal food temperature, the time interval over which the rate of change of internal food temperature occurred and the selected internal food temperature.

28. The food thermometer system of claim 25, wherein said first unit is further operable to transmit the time remaining for the food being cooked to reach a select temperature.

29. The food thermometer system of claim 28, further comprising a second unit operable to receive the time remaining for the food being cooked to reach a select temperature transmitted by the first unit.

30. The food thermometer system of claim 29, wherein said second unit includes a display section operable to display the time remaining for the food being cooked to reach a select temperature.

31. The food thermometer system of claim 25, wherein said first unit is operable to select a type of food being cooked.

32. The food thermometer system of claim 31, wherein the selection of the type of food being cooked includes a meat selected from the group consisting of beef, pork, fish and poultry.

33. The food thermometer system of claim 25, wherein said first unit is operable to select a taste of the food being cooked.

34. The food thermometer system of claim 33, wherein the selection of the taste includes a cooking taste selected from the group consisting of rare, medium rare, medium and well done.

35. A method for predicting the cooking completion time of food being cooked, comprising:

acquiring the internal temperature of the food being cooked;

storing the acquired internal temperature readings in a memory;

computing the difference between the current internal food temperature reading and the previous internal food temperature reading, the computed difference indicating a rate of change of the internal food temperature; and predicting the cooking time of the food being cooked based on the computed difference and a predetermined internal food cooking temperature.

36. The method of claim 35, wherein the internal food temperature readings are acquired at 30 second intervals.

37. The method of claim 35, wherein the step of acquiring further comprises inserting a temperature probe into the food being cook.

38. The method of claim 35, further comprising storing each of the computed differences.

39. The method of claim 38, wherein predicting further comprises comparing the difference between the current temperature reading and the previous temperature reading with each of the computed differences and calculating the time remaining until the pre-determined internal cooking temperature is reached.

* * * * *

UNITED STATES PATENT AND TRADEMARK OFFICE
CERTIFICATE OF CORRECTION

PATENT NO. : 7,102,107 B1  Page 1 of 1
APPLICATION NO. : 10/922462
DATED : September 5, 2006
INVENTOR(S) : Peter A. Chapman It is certified that error appears in the above-identified patent and that said Letters Patent is hereby corrected as shown below:

Column 6, line 18, "tk" should read -- $t_k$ --.
Column 6, line 43, "F.," should read -- F,--.

Signed and Sealed this

Twenty-sixth Day of June, 2007

JON W. DUDAS
*Director of the United States Patent and Trademark Office*